2,728,738

VINYL-TYPE RESINS PLASTICIZED WITH ALKOXYALKYL DIESTERS OF BIS (CARBOXYPHENYL) SULFONES

John R. Caldwell, Kingsport, Tenn., assignor to Eastman Kodak Company, Rochester, N. Y., a corporation of New Jersey No Drawing. Application January 2, 1953, Serial No. 329,440

14 Claims. (Cl. 260—30.8)

This invention relates to the alkoxyalkyl and alkoxyalkoxyalkyl esters of bis (carboxyphenyl) sulfones and to their employment as plasticizers in synthetic resins and cellulose esters. These esters as referred to elsewhere in this specification are diesters.

This application is a continuation-in-part of my application, Serial No. 134,338 filed December 21, 1949, now U. S. Patent 2,643,954, dated June 30, 1953.

Bis (4-carboxyphenyl) sulfone has the formula:

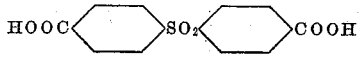

and is a well known compound which can be prepared, for example, from toluene and sulfuric acid, cf. Meyer, Ann. 433, 336 (1923). Alkyl esters of this dicarboxylic sulfone are also known, e. g. Meyer describes the methyl and ethyl esters thereof. In U. S. 2,427,640, patented September 16, 1947, the unsaturated alkyl esters are disclosed and said to be useful as plasticizers. The saturated alkyl esters are also employable as plasticizers.

I have now found that the alkoxyalkyl and alkoxyalkoxyalkyl esters of the above acid and its isomers wherein the carboxyl radicals are in the 2,2'-, 2,3'-, 2,4'-, 3,3'-, and 3,4'-positions are also useful as plasticizers. The synthetic resins into which they are incorporated possess improved surface hardness and plasticizer retention qualities. They can be employed in plasticizing many synthetic resins including such resins as the polymers and copolymers which can be derived from monoethylenically unsaturated polymerizable compounds. The alkoxyalkyl esters are compatible, in general, with cellulose acetates, propionates, acetate-propionates, acetate-butyrates, and other cellulose derivatives. In contrast to this, the alkyl esters are generally not compatible with the cellulose acetates, propionates, acetate-propionates and acetate-butyrates. The alkoxyalkyl esters impart a greater surface hardness to many synthetic resins. Thus, in compounding a particular composition having a given flow temperature, the resulting plastics products containing the alkoxyalkyl esters as plasticizers possess a greater surface hardness than the same resins containing conventional plasticizers such as di-2-ethylhexyladipate, etc. In other words, the alkoxyalkyl and alkoxyalkoxyalkyl esters plasticize synthetic resins and the cellulose derivatives so that they can be readily molded but with the result that the plastics products so produced are considerably harder than could be obtained with conventional plasticizers.

The isomers of bis (4-carboxyphenyl) sulfone can also be prepared as described by Meyer in the literature cited above. Approximately three-fourths of the sulfone yield obtained by Meyer is bis (4-carboxyphenyl) sulfone with the remainder consisting of various isomers thereof, principally the 2,4'-isomer and the 2,2'-isomer with a small proportion of the 3,4'-isomer. These isomers can be separated by fractional recrystallization from solvents such as ethyl acetate or butyl acetate.

The various isomers of bis (carboxyphenyl) sulfone can also be prepared by condensing the various toluene sulfonyl chlorides with toluene by the Friedel-Crafts reaction, as described by Beckurts and Otto, Ber., 11, 472, 2066 (1878). This reaction results in this preparation of various isomers of ditolylsulfone. These isomers can be converted to the corresponding bis (carboxyphenyl) sulfones by oxidation with permanganate or chromic acid as described by Meyer in the article cited above.

It is an object of my invention to provide alkoxyalkyl and alkoxyalkoxyalkyl diesters of various isomers of bis (carboxyphenyl) sulfone and a method for their preparation. It is also an object of my invention to provide new and useful plasticizers for synthetic resins which are of improved compatability and result in increased hardness in the plastic compositions made therewith. It is a further object of my invention to provide such plasticizers for cellulose esters insofar as concerns those plasticizers disclosed by the instant application which are not covered by the claims of the parent application. Other objects will appear elsewhere herein.

The alkoxyalkyl esters and the alkoxyalkoxyalkyl esters of the various isomers of bis (carboxyphenyl) sulfone can be produced by esterifying one or more of these dicarboxy isomers with a monoalkyl ether or a monoalkoxyalkyl ether of an alkylene glycol having the formula R'—O—R—OH wherein R represents an alkylene radical containing from 2 to 4 carbon atoms and R' represents a substituent selected from the group consisting of an alkyl radical containing from 1 to 6 carbon atoms and an alkoxyalkyl radical containing from 2 to 8 carbon atoms. The esterification reaction is advantageously conducted in the presence of an esterification catalyst at an elevated temperature.

Esterifying agents which can be employed include sulfuric acid, p-toluenesulfonic acid, and various other compounds which are known to catalyze esterification reactions, e. g. hydrochloric acid, ethylsulfuric acid, ethylsulfonic acid, benzenesulfonic acid, trichloroacetic acid, zinc chloride, etc. Generally speaking, I advantageously employ either p-toluenesulfonic acid or sulfuric acid since they are readily available, quite effective, and produce no undesirable side reactions; however, it is quite apparent that most of the commonly known esterification catalysts could also be used.

The monoalkyl ethers of alkylene glycols which I can employ are defined by the general formula set forth above and include ethylene glycol monobutyl ether, ethylene glycol monomethyl ether, ethylene glycol monoethyl ether, propylene glycol monoethyl ether, butylene glycol monoethyl ether, ethylene glycol monohexyl ether, etc. Quite advantageously, I employ the ethylene glycol monoalkyl ethers in most instances. Most advantageously, I employ ethylene glycol monoethyl ether. In addition to the monoalkyl ethers, various monoalkoxyalkyl ethers can be similarly employed, e. g. ethylene glycol monoethoxyethyl ether, etc.

The esterification reaction can be advantageously conducted under conditions that allow the water which is formed to be removed. It is generally advantageous to conduct the reaction under a reflux condition which allows the water formed to distill off. Periods of time of serveral hours duration are required to obtain good yields, e. g. 5 to 20 hours; however, longer or shorter periods of time can be employed. The products obtained can be advantageously isolated by washing with water. In some cases they may be distilled in a molecular still. Most of the products obtained are liquids. The yields are usually in the vicinity of 65–80 percent.

The diester compounds of this invention can also be prepared by employing the acid chlorides instead of the dicarboxy acids as starting catalysts.

In employing the process described above, the alkylene glycol ethers are advantageously employed in considerable excess in order to obtain good yields. The theoretical amount required is 2 mols per mol of the bis (carboxyphenyl) sulfone; however, it is advantageous to employ a considerable excess of the ether over that theoretically required. From 4 to 10 mols can be employed advantageously per mol of the sulfone; however, lower or higher proportions can also be employed.

The resulting esters can be readily separated from the reaction mixture by distilling off the excess alkylene glycol monoalkyl ether under a vacuum and then washing the residue with a dilute aqueous alkaline solution, e. g. potassium hydroxide, sodium hydroxide, various alkaline salts such as sodium carbonate, etc., to neutralize the esterification catalyst. The ester can then be purified by recrystallization from ethyl alcohol or other inert solvent, e. g. dioxane, methyl alcohol, etc.

The alkoxyalkyl and alkoxyalkoxyalkyl esters can also be produced by other methods, thus, the bis (4-carboxyphenyl) sulfones can be heated with a molecular excess of $PCl_5$ to form the acid chloride. Upon further heating the HCl and $POCl_3$ which forms and the excess $PCl_5$ can be driven off and the remainder comprising the crude acid chloride of a bis (carboxyphenyl) sulfone can then be converted to the ester by dissolving it in an excess of an alkylene glycol ether and heating the mixture in a vacuum to remove the HCl which forms and the excess alkylene glycol monoalkyl ether. The resulting alkoxyalkyl ester of a bis (carboxyphenyl) sulfone can then be separated and purified as described previously.

Examples of alkoxyalkyl and alkoxyalkoxyalkyl esters which can be prepared according to these processes include, as examples, the methoxyethyl ester of various bis (4-carboxyphenyl) sulfones, the ethoxyethyl ester, the butoxyethyl ester, the ethoxypropyl ester, the methoxyhexyl ester, the propoxybutyl ester, the ethoxyethoxyethyl ester, the butoxyethoxyethyl ester, etc.

The alkoxyalkyl and alkoxyalkoxyalkyl esters can be advantageously employed as plasticizers for the lower aliphatic saturated monoacid (acyl) esters of cellulose, e. g. cellulose acetate, cellulose propionate, cellulose acetate-propionate, cellulose acetate-butyrate, cellulose propionate-butyrate, etc. These esters can also be employed as plasticizers for other cellulose derivatives such as cellulose nitrate, various cellulose ethers, e. g. ethyl cellulose, benzyl cellulose, etc. The alkoxyalky esters can furthermore be employed to plasticize synthetic resins derived essentially from monoethylenically-unsaturated, polymerizable compounds which comprise those containing a —CH=C= group. Exemplary compounds include such compounds as styrene, α-methylstyrene, p-acetaminostyrene, α-acetoxystyrene, vinyl chloride (when chloride monomer is vinylidene chloride), vinylidene chloride (when chloride monomer is vinyl chloride), ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, vinyl esters (e. g. vinyl acetate), vinyl alcohol, acrylamides (e. g. N-isopropylacrylamide), maleamides (e. g. N,N'-methylethylmaleamide), fumaramides (e. g. N-n-butylfumaramide), itaconamides (e. g. N-ethylitaconamide), citraconamides (e. g. N, N'-tetramethylcitraconamide), maleamates (e. g. N-ethylmethylmaleamate), fumaramates (e. g. N-methyl di-n-butylfumaramate), itaconamates (e. g. propyl itaconamate), citraconamates, acrylates (e. g. methyl acrylate), methacrylates (e. g. ethyl methacrylate), trifluorovinyl acetate, tetrafluoroethylene, 1,1-difluoro-2,2-dichloroethylene, etc. Especially useful polymerizable compounds coming within the scope of this case comprise those containing a $CH_2$=C< group.

The alkoxyalkyl and alkoxyalkoxyalkyl esters of bis (carboxyphenyl) sulfones can be incorporated into these resins in any manner known in the prior art. They can be employed in combination with other plasticizers, e. g. diethyl phthalate, triphenyl phosphate, dibutyl adipate, di-2-ethylhexyladipate, etc. Generally, it is advantageous to employ the alkoxyalkyl and alkoxyalkoxyalkyl esters in the amount of from about 15 to about 60% by weight of the resinous material into which they are being incorporated. Of course, higher or lower percentages can be used. Usual methods which can be employed for incorporating these plasticizers into synthetic resins include intermixing the plasticizer and resin on mixing rolls, churns, etc. The plasticizers can also be advantageously incorporated into a dope or solution of the resin to be plasticized with the solvent being removed subsequently to form a sheet film, or coating, etc. which is tough, clear and hard-surfaced. The solvents which can be employed are innumerable. Examples of solvents which can be advantageously employed include alkyl alcohols, e. g. methyl alcohol, ethyl alcohol, etc., various ketones, e. g. acetone, etc. and numerous other industrial solvents which are reactively inert to the alkoxyalkyl and alkoxyalkoxyalkyl esters.

The following examples will serve to further illustrate the manner of practicing my invention.

*Example 1.—Butoxyethyl ester of bis (4-carboxyphenyl) sulfone*

50 g. of bis (4-carboxyphenyl) sulfone, 100 g. of ethylene glycol monobutyl ether (mol ratio of approximately 1 to 5.2), and 2 g. of p-toluenesulfonic acid were refluxed under conditions that allowed the water formed by the esterification reaction to distill. The refluxing was continued until a clear solution was obtained which required 10–15 hours. The excess ethylene glycol monobutyl ether was removed by fractionation under a vacuum. The remaining residue was then washed with a dilute aqueous solution of sodium hydroxide and subsequently recrystallized from ethyl alcohol. A yield of 75–80% of the butoxyethyl ester of bis (4-carboxyphenol) sulfone was obtained which had a melting point of 115°–116° C.

*Example 2.—Ethoxyethyl ester of bis (4-carboxyphenyl) sulfone*

50 g. of ethylene glycol monoethyl ether, 20 g. of bis (4-carboxyphenyl) sulfone (mol ratio of approximately 1 to 8.5), and 2 g. of sulfuric acid were refluxed under the same conditions as in Example 1 and the product was separated and purified in the same manner. A yield of 65–70% of the ethoxyethyl ester of bis (4-carboxyphenyl) sulfone was obtained which had a melting point of 104° C.

*Example 3.—Methoxyethyl ester of bis (4-carboxyphenyl) sulfone*

One mol proportion of bis (4-carboxyphenyl) sulfone was heated at 150°–170° C. with 2.4 mol proportions (20% excess) of $PCl_5$ to form the acid chloride of bis (4-carboxyphenyl) sulfone. The mixture was heated at 90°–110° C. in a vacuum to remove the HCl ond $POCl_3$ which formed and the excess $PCl_5$. The crude acid chloride was then stirred with 6 mol proportions (200% excess) of ethylene glycol monomethyl ether until it had all dissolved. The reaction mixture was then heated in a vacuum at 70°–80° C. to remove the HCl which formed and the excess ethylene glycol monomethyl ether. The residue was then stirred with a dilute aqueous sodium hydroxide solution, filtered and washed. After recrystallizing from ethyl alcohol, a yield of 70–75% of the methoxyethyl ester of bis (4-carboxyphenyl) sulfone was obtained which had a melting point of 133° C.

*Example 4.—Ethoxyethyl ester of 2,4'-dicarboxy diphenylsulfone*

50 g. of 2,4'-dicarboxy diphenylsulfone, 100 g. of ethylene glycol monoethyl ether, and 2.0 g. of p-toluene sulfonic acid were refluxed under conditions that allowed the water formed by the reaction to distill. Refluxing was continued until a clear solution was obtained. A time of 10–15 hours was required. The excess ethylene glycol monoethyl ether was removed under vacuum. The residue was washed with dilute sodium carbonate solution, then with water. For most purposes, the product is suitable for use after this treatment. However, if further purification is desired, the ester may be distilled in a molecular still. The product obtained was the ethoxyethyl ester of 2,4'-dicarboxy diphenylsulfone.

*Example 5.—Methoxyethyl ester of 3,4'-dicarboxy diphenylsulfone*

50 g. of 3,4'-dicarboxy diphenylsulfone, 100 g. of the monomethyl ether of ethylene glycol, and 2.0 g. sulfuric acid were refluxed under conditions that allowed the water of reaction to distill. Refluxing was continued until a clear solution was obtained. The mixing was then poured into water. The insoluble layer obtained was washed with dilute sodium carbonate solution, then with water. The product can be purified further by distilling in a molecular still. The product obtained was the methoxyethyl ester of 3,4'-dicarboxy diphenylsulfone.

*Example 6.—Butoxyethyl ester of 2,2'-dicarboxy diphenylsulfone*

50 g. of 2,2'-dicarboxy diphenylsulfone was heated at 150–170° C. with 20 percent molar excess of PCl₅ to form the acid chloride. The mixture was then heated at 90–110° C. in vacuum to remove HCl and POCl₃. The crude acid chloride was then stirred with 200% excess monobutyl ether of ethylene glycol until dissolved. The reaction mixture was heated at 70–80° C. in vacuum to remove HCl and excess monobutyl ether of ethylene glycol. The residue was washed with dilute sodium carbonate, then with water. The product may be further purified by distilling in a molecular still. The product obtained was the butoxyethyl ester of 2,2'-dicarboxy diphenylsulfone.

*Example 7.—Ethoxyethoxyethyl ester of isomeric bis (carboxyphenyl) sulfones*

50 g. of a mixture of isomeric bis (carboxyphenyl) sulfones, 100 g. of ethylene glycol monoethoxyethyl ether, and 2 g. of p-toluene sulfonic acid were refluxed under conditions that allowed the water formed by the esterification reaction to distill. The refluxing was continued until a clear solution was obtained. The excess ethylene glycol monoethoxyethyl ether was removed by fractionation under a vacuum. The remaining residue was then washed with a dilute aqueous solution of sodium hydroxide and subsequently recrystallized from ethyl alcohol. The product obtained was the ethoxyethoxyethyl ester of mixed isomeric bis (carboxyphenyl) sulfones.

*Example 8.—Plasticized vinyl chloride-vinyl acetate resin containing the ethoxyethyl ester of bis (4-carboxyphenyl) sulfone*

A dope was made containing 10 g. of a vinyl resin consisting of 85% vinyl chloride and 15% vinyl acetate, 4 g. of the ethoxyethyl ester of bis (4-carboxyphenyl) sulfone and 60 cc. of acetone. Films cast from this dope were clear, tough and resistant to marring, scratching and surface deformation.

*Example 9.—Plasticized vinyl chloride-vinyl acetate resin containing the butoxyethyl ester of bis (4-carboxyphenyl) sulfone*

A dope was made containing 10 g. of a vinyl resin consisting of 87% vinyl chloride and 13% vinyl acetate, 3.5 g. of the butoxyethyl ester bis (4-carboxyphenyl) sulfone and 75 cc. of dioxane. Films were cast from this dope. They were clear and flexible. They show excellent plasticizer retention when immersed in water or when heated at 90°–100° C. for 24 to 48 hours.

*Example 10.—Plasticized vinyl chloride-acrylonitrile resin containing the ethoxyethyl ester of mixed isomeric sulfones*

A dope was made containing 10 g. of a vinyl resin consisting of 60% vinyl chloride and 40% by weight of acrylonitrile, 2.8 g. of the ethoxyethyl ester of a mixture of various isomers of bis (carboxyphenyl) sulfone and 60 cc. of acetone. Films were cast from this dope. They were clear and flexible. They are tough and resistant to marring, scratching and surface deformation.

*Example 11.—Plasticized methacrylonitrile-methyl acrylate resin containing the methoxyethyl ester of mixed isomeric sulfones*

An emulsion polymer was made consisting of 60% methacrylonitrile and 40% by weight of methyl acrylate. One hundred parts by weight of this emulsion polymer and 30 parts of a mixture of various isomers of methoxyethyl ester of bis (carboxyphenyl) sulfone were mixed together at 70°–80° C. in a Banbury type mixer. The resinous product obtained was extruded to produce rods, tubes, sheets, etc. The products obtained had excellent surface characteristics.

*Example 12.—Plasticized polyvinylisobutyral resin containing the methoxyethyl ester of mixed isomeric sulfones*

A dope was prepared containing 10 g. of polyvinylisobutyral, 2 g. of the methoxyethyl ester of a mixture of various isomers of bis (carboxyphenyl) sulfone, 40 cc. of ethylene chloride and 10 cc. of ethyl alcohol. Films were cast from this dope which were clear and flexible. They show excellent plasticizer retention and have excellent surface characteristics.

*Example 13.—Plasticized polyvinyl chloride resin containing the ethoxyethoxyethyl ester of mixed isomeric sulfones*

A dope was made containing 10 g. of polyvinyl chloride, 3.8 g. of the ethoxyethoxyethyl ester of isomeric bis (carboxyphenyl) sulfones and 60 cc. of tetrahydrofuran. Clear, flexible films were cast employing this dope. These films were characterized by excellent surface characteristics and superior plasticizer retention.

Other dopes and molding compositions can also be prepared using other alkoxyalkyl and alkoxyalkoxyalkyl esters such as the butoxyethoxyethyl, the hexoxymethyl, the pentoxypropoxyethyl, the ethoxypropyl ester, etc. and employing other resins such as the vinyl resins listed above. Thus, 20% by weight of the butoxyethyl ester can be incorporated on hot rolls into any of the above-described synthetic resins and subsequently formed into injection-molded products possessing excellent surface characteristics. Similarly, other dopes can be prepared, for example, by preparing a solution in acetone of polystyrene containing 35% by weight of the resin of a mixture of the ethoxypropyl and the methoxyethyl esters of bis (4-carboxyphenyl) sulfone, from which sheets or films can be produced possessing excellent surface characteristics.

As pointed out at the beginning of this specification, all of the esters of bis (carboxyphenyl) sulfones mentioned hereinabove are diesters containing two alkoxyalkyl groups in each molecule. The "di" prefix has been omitted in most instances for brevity.

I claim:

1. A plastic composition comprising a synthetic resin derived from monoethylenically unsaturated, polymerizable compounds containing a —CH=C= group having incorporated therein an ester having the following formula:

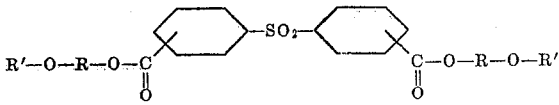

wherein R represents an alkylene radical containing from 2 to 4 carbon atoms and R' represents a substituent selected from the group consisting of an alkyl radical containing from 1 to 6 carbon atoms and an alkoxyalkyl radical containing from 2 to 8 carbon atoms, the nuclearly substituted positions being selected from any of the ortho, meta and para positions with respect to the $SO_2$ group.

2. A plastic composition as defined in claim 1 wherein the synthetic resin is a copolymer of vinyl chloride and vinyl acetate.

3. A plastic composition as defined in claim 1 wherein the synthetic resin is a copolymer of vinyl chloride and acrylonitrile.

4. A plastic composition as defined in claim 1 wherein the synthetic resin is a copolymer of methacrylonitrile and methyl acrylate.

5. A plastic composition as defined in claim 1 wherein the synthetic resin is polyvinylisobutyral.

6. A plastic composition as defined in claim 1 wherein the synthetic resin is polyvinyl chloride.

7. A plastic composition as defined in claim 1 wherein there is present from about 15 to 60 percent by weight of the ester.

8. A plastic composition as defined in claim 1 wherein there is present from about 15 to 60 percent by weight of the ethoxyethyl diester of bis (4-carboxyphenyl) sulfone.

9. A plastic composition as defined in claim 1 wherein there is present from about 15 to 60 percent by weight of the butoxyethyl diester of bis (4-carboxyphenyl) sulfone.

10. A plastic composition as defined in claim 1 wherein there is present from about 15 to 60 percent by weight of the ethoxyethoxyethyl diester of bis(4-carboxyphenyl) sulfone.

11. A plastic composition as defined in claim 1 wherein there is present from about 15 to 60 percent by weight of the butoxyethoxyethyl diester of bis(4-carboxyphenyl) sulfone.

12. Diesters of bis (carboxyphenyl) sulfones having the general formula:

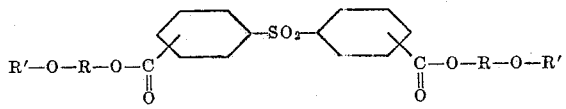

wherein R represents an alkylene radical containing from 2 to 4 carbon atoms and R' represents an alkoxyalkyl radical containing from 2 to 8 carbon atoms, the nuclearly substituted positions being selected from any of the ortho, meta and para positions with respect to the $SO_2$ group.

13. The ethoxyethoxyethyl diester of bis(4-carboxyphenyl) sulfone.

14. The butoxyethoxyethyl diester of bis(4-carboxyphenyl) sulfone.

References Cited in the file of this patent
UNITED STATES PATENTS 2,643,954    Caldwell _____ June 30, 1953